(12) United States Patent
Fish

(10) Patent No.: US 9,507,771 B2
(45) Date of Patent: *Nov. 29, 2016

(54) METHODS FOR USING A SPEECH TO OBTAIN ADDITIONAL INFORMATION

(75) Inventor: Robert D. Fish, Tustin, CA (US)

(73) Assignee: NYTELL SOFTWARE LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/572,224

(22) Filed: Aug. 10, 2012

(65) Prior Publication Data

US 2012/0310623 A1    Dec. 6, 2012

Related U.S. Application Data

(62) Division of application No. 13/426,074, filed on Mar. 21, 2012, which is a division of application No. 10/466,202, filed as application No. PCT/US00/25613 on Sep. 15, 2000, now Pat. No. 8,165,867.

(51) Int. Cl.
  *G06F 17/28* (2006.01)
  *H04L 29/06* (2006.01)
  *H04M 1/27* (2006.01)
  *H04M 1/725* (2006.01)
  *H04L 29/08* (2006.01)

(52) U.S. Cl.
  CPC ............ *G06F 17/289* (2013.01); *H04L 29/06* (2013.01); *H04L 67/16* (2013.01); *H04M 1/271* (2013.01); *H04M 1/7253* (2013.01); *H04L 69/329* (2013.01); *H04M 2250/58* (2013.01)

(58) Field of Classification Search
  USPC .................... 704/3, 246, 247, 251, 252, 271
  See application file for complete search history.

(56) References Cited

U.S. PATENT DOCUMENTS

| | | | |
|---|---|---|---|
| 4,275,266 A | 6/1981 | Lasar | |
| 4,829,554 A | 5/1989 | Barnes | |
| 4,882,681 A | 11/1989 | Brotz | |
| 5,305,244 A | 4/1994 | Newman et al. | |
| 5,729,659 A | 3/1998 | Potter | |
| 5,818,733 A | 10/1998 | Hyuga | |
| 5,855,003 A | 12/1998 | Ladden | |
| 5,917,944 A | 6/1999 | Wakisaka | |
| 5,926,790 A * | 7/1999 | Wright | .......................... 704/275 |
| 5,946,376 A | 8/1999 | Cistulli | |

(Continued)

FOREIGN PATENT DOCUMENTS

| | | |
|---|---|---|
| WO | 01/82789 | 11/2001 |
| WO | 01/97211 | 12/2001 |

*Primary Examiner* — Leonard Saint Cyr
(74) *Attorney, Agent, or Firm* — Brundidge & Stanger, P.C.

(57) ABSTRACT

An item of information (212) is transmitted to a distal computer (220), translated to a different sense modality and/or language (222), and in substantially real time, and the translation (222) is transmitted back to the location (211) from which the item was sent. The device sending the item is preferably a wireless device, and more preferably a cellular or other telephone (210). The device receiving the translation is also preferably a wireless device, and more preferably a cellular or other telephone, and may advantageously be the same device as the sending device. The item of information (212) preferably comprises a sentence of human of speech having at least ten words, and the translation is a written expression of the sentence. All of the steps of transmitting the item of information, executing the program code, and transmitting the translated information preferably occurs in less than 60 seconds of elapsed time.

16 Claims, 1 Drawing Sheet

(56) References Cited

U.S. PATENT DOCUMENTS

| | | |
|---|---|---|
| 5,956,681 A | 9/1999 | Yamakita |
| 5,982,853 A | 11/1999 | Libermann |
| 6,080,972 A | 6/2000 | May |
| 6,101,473 A | 8/2000 | Scott et al. |
| 6,292,854 B1 | 9/2001 | Priem |
| 6,345,389 B1* | 2/2002 | Dureau ......................... 725/116 |
| 6,374,224 B1 | 4/2002 | Horiguchi |
| 6,397,267 B1 | 5/2002 | Chong, Jr. |
| 6,477,498 B1 | 11/2002 | Gortz |
| 6,584,376 B1 | 6/2003 | Van Kommer |
| 6,584,439 B1 | 6/2003 | Geilhufe |
| 6,633,235 B1 | 10/2003 | Hsu et al. |
| 6,654,378 B1 | 11/2003 | Mahany |
| 6,654,388 B1* | 11/2003 | Lexenberg et al. ........... 370/498 |
| 6,920,425 B1 | 7/2005 | Will et al. |
| 7,286,990 B1 | 10/2007 | Edmonds |
| 7,912,696 B1 | 3/2011 | Asano |
| 2002/0069063 A1 | 6/2002 | Buchner et al. |
| 2002/0193989 A1* | 12/2002 | Geilhufe et al. .............. 704/208 |
| 2003/0093281 A1* | 5/2003 | Geilhufe et al. .............. 704/275 |
| 2003/0212364 A1 | 11/2003 | Mann et al. |

* cited by examiner

METHODS FOR USING A SPEECH TO OBTAIN ADDITIONAL INFORMATION

PRIORITY

This application is a divisional of U.S. patent application Ser. No. 13/426,074, filed Mar. 21, 2012, which is a divisional of U.S. patent application Ser. No. 10/466,202 filed Sep. 6, 2006 (now U.S. Pat. No. 8,165,867), which is U.S. National Phase of PCT/US00/25613 filed Sep. 15, 2000 both of which are incorporated herein by reference in their entirety.

FIELD OF THE INVENTION

The field of the invention is remote computing.

BACKGROUND OF THE INVENTION

As processing speeds continue to improve and data storage becomes ever less expensive, many sophisticated applications that were previously only available on mainframe or desktop computers have been ported to laptop computers and other portable electronic equipment. Many applications have even been ported to hand held electronic devices as well, including hand held computers, digital telephones, personal digital assistants (PDAs), and so forth. For example, personal databases with limited search capabilities are now included in cellular phones, and word processing can now be performed in PDAs.

There are, however, several applications that are presently difficult or impossible to realize on hand-held electronic devices, and are only poorly realized even on larger systems such as desktop computers. Due to the large volumes of data involved, and the need to process at very high speeds, a particularly difficult application is voice recognition. Some attempts have been made in that direction, but all of them suffer from one or more disadvantages.

At the low end, limited word or phrase recognition capabilities are sometimes provided in cell phones. Such systems can usually recognize only a few words (e.g., the numerals 0-9, and specialized key words such as a person's name, or the commands "dial" or "open file patentapp.doc"). Such systems are particularly advantageous where only rudimentary recognition capabilities are needed, or where only very limited data storage capability or computing power is available. However, an obvious shortcoming of the word or phrase recognition systems is that the usability is limited to a small, preprogrammed vocabulary, and at most a few custom words. Moreover, word or phrase recognition systems often fail to recognize personal speech pattern or accents.

At the higher end, speech recognition programs are currently available for operation on laptop computers. As used herein both "speech recognition" and "word or phrase recognition" are considered to be categories of voice recognition. "Speech recognition", however, is limited to systems having a vocabulary of at least 200 words, and where individual words are interpreted in the context of surrounding words. For example, speech recognition would correctly interpret phrases such as "I have been to the beach" whereas a word or phrase recognition system may substitute "bean" for "been".

As with other computer software application, most of the development effort is being directed towards porting the more sophisticated speech recognition to smaller and smaller devices. It may well be that within a decade the goal of true speech recognition will be available on even handheld electronic devices.

What is not presently appreciated, however, is that porting of sophisticated software to portable electronic devices may not be desirable. Cell phones, for example, need only relatively rudimentary electronics to support the required communications, and placing sophisticated storage and processing in cell phones may be a waste of money. Moreover, no matter how sophisticated the software and hardware becomes in hand held and other portable devices, there will always be a perceived need for additional capabilities. Larger or specialized vocabularies may be desired, as well as recognition capabilities for different accents and languages, and perhaps even language translation capabilities. Still further, it is impractical to install voice recognition in all the myriad types of devices that may advantageously utilize voice recognition. For example, voice recognition may be useful in VCR and CD players, kitchen and other household appliances such as toasters and washing machines, automobiles and so forth.

Thus, while it has been known to translate information in a first sense modality and language into a second sense modality and language on a single local computer, it has not been appreciated to perform the translation in a "remote computing" manner, thereby concentrating the computing power in a cost effective manner. Consequently, there is a need to provide voice recognition capabilities, and especially speech recognition capabilities, to myriad electronic devices without actually installing all of the required hardware and software in all such devices.

SUMMARY OF THE INVENTION

The present invention provides systems and methods in which an item of information is transmitted to a distal computer, translated to a different sense modality and/or language, and in substantially real time, and the translation is transmitted back to the location from which the item was sent.

The device sending the item is preferably a wireless device, and more preferably a cellular or other telephone. The device receiving the translation is also preferably a wireless device, and more preferably a cellular or other telephone, and may advantageously be the same device as the sending device. The item of information preferably comprises a sentence of human speech having at least ten words, and the translation is a written expression of the sentence. All of the steps of transmitting the item of information, executing the program code, and transmitting the translated information preferably occurs in less than 60 seconds of elapsed time, and more preferably less than 30 seconds.

Various objects, features, aspects and advantages of the present invention will become more apparent from the following detailed description of preferred embodiments of the invention, along with the accompanying drawing.

DETAILED DESCRIPTION

Figure 1:
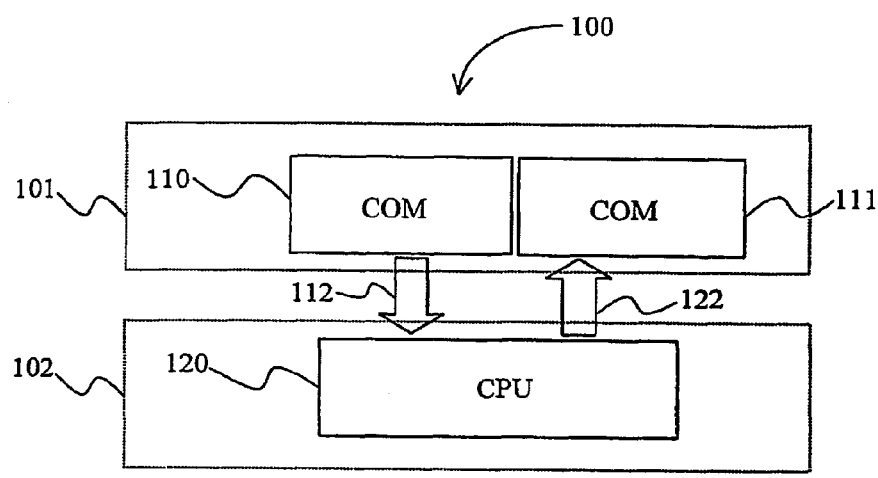
FIG. 1 is an exemplary schematic of a method of changing the sense modality of an information according to the inventive subject matter.

As used herein, the term "sense modality" refers to the manner in which information is perceived by a human being. There are five sense modalities comprising sight, sound, taste, smell, and touch. Obviously, different aspects of information may be expressed in multiple sense modalities at the same time. A conversation between two people, for example, may be perceived as both sound (spoken language) and sight (hand gestures). Similarly, music can be perceived as both sound (auditorily perceived vibration) and touch (tactually perceived vibration).

Information in each of the five sense modalities can be expressed in numerous languages, with the term "language" being interpreted very broadly. Information expressed in the sight modality, for example, can be expressed in various text languages as well as various graphics languages. Exemplary text languages include the various character sets of human languages (Roman, Cyrillic, Chinese, etc), as well as computer languages (ASCII, HTTP, XML, Basic, Cobol, Pascal, C++, etc). Graphics "languages" include moving images, still images, painting, and so forth.

Even within a given language there are different styles, which are also referred to herein from time to time as styles. Character fonts (Arial, Courier, Gothic, Lucida, Times New Roman, various forms of handwriting, etc) comprise one type of style, and various sizings and spacings of characters comprise other styles. With respect to graphics there are styles here as well. Moving images, for example, can be styled as VCR or Beta video, or DVD. Similarly, still images can be styled as hard copy photographs, TIP, GIF, and other computer files.

The sense modality of sound is also deemed herein to include several languages, including the various spoken and written human languages, various languages of music (including, for example, classical music, rock music, punk music, and jazz), animal sounds, industrial sounds, transportation sounds, and electronic sounds such as beeps. Still other languages are contemplated as well, each of which may have several different styles. With the language of classical music, for example, some of the possible styles include baroque, modem, and so forth.

Technically, the sense modality of taste only includes four possible sensations, sweet, sour, salty and bitter. In our lexicon these would comprise the different languages of taste, with variations within each sensation comprising the different styles.

In our lexicon, the sense modality of smell includes the "languages" of florals, musks, foods, inorganics, etc.

In our lexicon, the sense modality of touch includes the "languages" of vibration, pressure, temperature, movement, texture, etc.

As can now be appreciated, the terms "sense modality", "language", and "style" are each used herein in a very specific manner. Sense modalities are distinguished one from another by the sense organ(s) primarily used to detect the information, while languages are different means of expression within a given sense modality. With a given sense modality and language, styles refer to variations in expressing information that can be achieved without changing the language.

All of these are distinguishable from the "medium", which is employed herein to mean the physical device upon which an item of information resides. A photographic image, for example, may reside on a piece of photographic paper, in which case the medium is the paper. The same image may also reside on computer disk, in which the medium is the disk. The image can also be transmitted via modem, in which case the medium may be a copper wire.

This is an important distinction because a change in medium does not necessarily mean a change in sense modality or style. For example, when a person talks on a portable telephone, the relevant item of information may be a spoken sentence. The sense modality would be sound, and the language may be that of English. The style may be very fast, slurred speech. The telephone translates the sounds into an analog or digital language for transmission through the medium of air, with the particular style depending upon the specific protocols of the service provider. Throughout the entire process, however, the sense modality is still considered to be sound because that is how a human being would perceive the information once it was converted back into an analog form at a frequency that the human being could understand. Similarly, even though the information may be interchanged between digital and analog, the information is still considered to maintain the same language and style.

There are many circumstances in which it is known to translate information between sense modalities, and between languages of the same or different sense modalities. For example, the jazz can be translated between written notes (sight modality, and possibly Western music transcription as the language) and notes played on an instrument (sound modality, with jazz as the language). Similarly, spoken English (sound modality, English language) can be translated between spoken German (sound modality, German language). Humans are quite adept at performing such translations internally, and as discussed above, computers are beginning to achieve a useful translation capability as well.

In all known instances of which the present inventor has knowledge, however, the information is never wirelessly transmitted to a distant computer for translation, translated at the distant computer .cat least 20 kilometers away), wirelessly returned to the location from which it was sent ("locally", "local", and "location" all being defined as within a radius of 100 meters), and then expressed locally 'to the source, all in substantially real time (less than three minutes from initial transmission of the information to expression of the translated information). Examples follow:

In laboratories that develop voice recognition software, it is presumably known to utilize a central computer for development work, and to access that computer using workstations wired into the central computer. That situation does not, however, involve wireless transmission, and the translating computer is not distal.

A user loads voice recognition software on a desktop or laptop computer, telephones the computer to record a message, and then accesses that information from a distant computer. In that situation the operation does not occur in substantially real time. The user most likely records several minutes of speech using his telephone, and then downloads a text file translated from the speech using a laptop or other computer.

One person transmits an e-mail to a recipient, and the recipient causes a computer to "read" the e-mail to him over the telephone. In that situation the total duration between transmitting of the e-mail and hearing it spoken is most likely not less than 60 seconds, and the message is most likely not heard locally to the place from which the e-mail was originally sent.

A user employs a distal central computer for computational purposes. The user enters the equation x=156×2, asks the computer for the answer, and the computer immediately transmits back the answer. That situation falls outside the present invention because the distal computer evaluated the expression rather than translate what was sent to it. If the computer had returned the spoken words "x equals one hundred fifty six times two", then the computer would have returned a translation.

A user has a cell phone that is connected to a music web site on the Internet. The user speaks the words "Beethoven's Fifth Symphony", and the web site transmits a portion of the symphony over the phone. This situation also falls outside the present invention because the distal computer evaluated the words rather than translated them. If the computer had returned the text "Beethoven's Fifth Symphony", then the computer would have returned a translation.

A user employs his cell phone to secure a dictionary definition. He speaks a particular word, the cell phone transmits the spoken word to a distal computer, and the distal computer returns the definition. This situation also falls outside the scope of the present invention because the distal computer evaluated the word rather than translating it.

Voice recognition software is used to operate a cell phone. There are two known possibilities here, neither of which fall within the inventive concepts herein. The first possibility is that the cell phone has some sort of primitive voice recognition. The user says "call home", and the telephone transmits that speech to a distal computer. The distal computer evaluates the number for "home", and places the call. This situation again falls outside of the present invention because (1) the distal computer evaluated the word "home" rather than translating it, and (2) the distal computer placed the call (or caused it to be placed) rather than sending the telephone number back to the cell phone.

A user types text into a terminal for transmission to a translation website. The website computer translates the text into another language, and returns the translation to the user.

These limitations are not merely design choices. Among other things, the present invention opens up an entire realm of possibilities not previously contemplated. Examples include:

A cell phone can be used as a dictation machine. Here, a user talks into his cell phone, the cell phone transmits the information back to a central mainframe that translates the speech into text, and then transmits the text back to the user's cell phone, PDA or other device for storage. When the user wants to hear past speech, the device that stored the text either reads back the text using local software, or transmits the text (directly or indirectly) back to the central computer, which then translates the text into speech, and then transmits the speech for playing.

A cell phone has an output port that connects to various household utilities and other devices. He plugs connector into the output port of the cell phone, and a corresponding port in one of the devices. He then talks to the device through the cell phone, using a message such as "turn on at 7 μm and off at 9 μm". The voice is transmitted to a distal computer, the computer translates the message into whatever command language the device uses, transmits the command language formatted message back to the cell phone, which then transmits it off to the device. Alternatively or additionally, the device may "talk" to the user by going through the cell phone.

A cell phone can be used as a translator. A user speaks into a cell phone in his native language, the cell phone transmits the speech to' a distal computer, the distal computer translates the speech into a second language, returns the translated speech back to the cell phone, which then repeats the speech in the second language. A preferred embodiment may even use two cell phones. There, the speaker speaks into his own cell phone, the speech is transmitted to the distal computer, translated, and returned to a local cell phone being held by a person that speaks another language.

A cell phone can be used as an aid for deaf persons. In this scenario a deaf person receives speech in his cell phone, the speech is sent to a distal computer for translation into text, and the text is returned to the cell phone or another device for local display. Such devices could be of great benefit for a deaf person watching television or a movie, attending a play, or simply speaking with other people. The system could also be used to help teach a deaf person to improve his vocalization.

A similar system could be used for blind people, where the cell phone transmits an image rather than sounds, and receives speech back from the distal computer instead of text. Sample sounds received from the distal computer and played locally may comprise simple, but very useful phrases such as "red light", "curb 20 feet away", "supermarket", and so forth. These would simple be voice translations of images that the blind person cannot see. A single, very sophisticated nationwide system could be put in place and made available for millions of deaf or blind individuals, requiring even each user to have only relatively inexpensive equipment.

A cell phone can be used to store information in a computer. Rather than purchase an inexpensive voice recognition software package, a user hooks his cell phone to his desktop, laptop, or hand-held computer. He speaks into the cell phone, the cell phone transmits the speech to a distal computer that translates the speech into text, and transmits the text back to the cell phone. The computer downloads the text from the cell phone.

A cell phone could be used to operate a computer, or even the cell phone itself. Here, the user speaks a command into the cell phone, the cell phone transmits the speech to a distal computer, the distal computer translates the speech into device commands, and transmits the text back to the cell phone. If appropriate, the computer downloads the commands from the cell phone, and executes the commands. In a simple example, the user could speak: the number "714-555-1212" into the cell phone, the cell phone could transmit that speech to the distal computer, which would translate the speech into the equivalent touch tone pulses, and transmit those pulses back to the cell phone. Once received, the cell phone would use those pulses to dial the number.

A cell phone can be used to look up terms. A user speaks the word "appendix" into his cell phone, the phone transmits the spoken word to a distal computer, the distal computer translates the word into a picture of an appendix, and then transmits the picture back to the cell phone for display. If the cell phone were coupled to a device that dispensed smells or tastes, a similar procedure could be used to translate terms such as "roast chicken" and "bitter" into the sense modalities of taste and smell. The same could also be true of sounds, where the users speaks the words "piano middle e" and the distal computer returns a piano tone at middle c.

It should be recognized that while each of these examples recites a cell phone, other communication devices could be used as well. The main requirements are that the communication device be capable of receiving an item of information in at least one sense modality and language, and transmitting that information wirelessly to a distant computer.

It should also be recognized that the distance between the device that initially transmits the information and the distal computer need not be limited to more than 20 kilometers. In other contemplated embodiments the distances could be limited to those greater than 1, 5, 10, 15, 25, 50, 100 km. Also with respect to distance, the device that receives the translated information may be disposed at other distances from the device that transmits the information to the distal computer. Instead of the two devices being disposed within a radius of 100 meters, the devices may less than 5, 10, 25, 5O, 75, 250, 500, 1000 meters ap81i. In a particularly preferred embodiment, the sending and receiving devices are the same device.

It should be still further recognized that the total duration between transmitting of the information to the distal computer and receiving back the translation could be limited to times other than less than 3 minutes. Other contemplated times include less than 5, 10, 30, and 45 seconds, and less than 1, 2, 4, 5, and 10 minutes. It may also warrant clarifying that these times refer to a first in-first out basis for an item of information. In preferred embodiments the device that sends the information to the distal computer begins transmitting within a few seconds after it begins to receive the information, and the distal computer begins translating the translation within a few seconds after the beginning of the translation becomes available. If all goes well, the translation of the beginning of a sentence, and certainly of a paragraph, is being received before the sentence or paragraph has been completely transmitted to the distal computer. This is not to say that the receiving device necessarily utilizes the translation (by displaying, performing, re-transmitting, etc), immediately upon receipt. Where a single cell phone is used as a foreign language translator, for example, the cell phone may wait until the user stops speaking for a second or two before expressing the translation.

FIG. 1 depicts an exemplary method 100 of changing the sense modality of an item of information according to the inventive subject matter, in which a communication device 110 in a first location 101 transmits an information in a first sense modality and language 112 to a computer 120 located in a distal location 102. The computer executes a program (not shown) that translates the information into a second sense modality and language different from the first sense modality and language 122. The translated information, now in the second sense modality and language 122, is then transmitted back to the first location 101 to a communication device 111.

It is important to note that the translation does not necessarily mean that both the sense modality and language are changed. Translating the information into a second sense modality and language different from the first sense modality and language means that either the sense modality is changed, or the language is changed, or both. The item of information is preferably speech, and more preferably a sentence of at least 5, 10, or 15 words. Other contemplated items of information include single words and short phrases, as well as what would comprise an entire paragraph is written. Still other contemplated items of information include sounds. It is contemplated, for example, to receive a musical performance into a cell phone, have the cell phone transmit the performed music to a distal computer, the distal computer translate the performed music into sheet music, and then send the sheet music back to the cell phone for display or storage.

Figure 2:
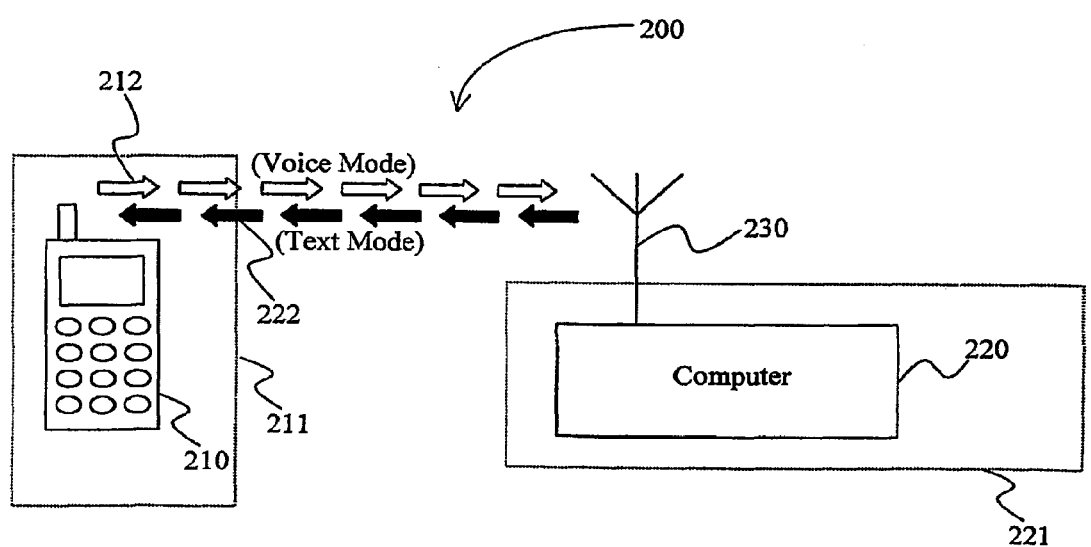
FIG. 2 is an exemplary embodiment of a method of changing the sense modality of an information according to the inventive subject matter.

In FIG. 2, a system 200 according to the present invention includes a communication device a first communication device 210 in a first location 211 that transmits information in a first sense modality 212 to a computer 220 in a distal location 221. The computer 220 receives the information in the first sense modality and executes a program that translates the first sense modality in the second sense modality (not shown). Transmitter 230 transmits the information in the second sense modality 222 back to the first communication device 210, or alternatively to a second communication device 230 at the first location 211.

The first communication device can be any suitable device, including a cellular phone, a PC, or a PDA. Where the first communication device is a cellular phone, it is particularly contemplated that such phones may have transient or permanent data storage capabilities of at least 150 k bytes, more preferably at least 1 MByte, and more preferably at least 4 MByte. There are various transient and permanent data storage elements for electronic devices known in the art (e.g., for telephone numbers, addresses, and other related information), all of which are contemplated for use herein. Cellular telephones need not be restricted to a particular communication standard, and exemplary suitable standards include the TDMA, CDMA, GSM and PDC standards.

Where the communication device comprises a PC or PDA, it is especially preferred that the data transmission to and from the device comprises broadband transmission via wireless interface. However, in alternative aspects of the inventive subject matter, data transmission may also include internal and external modems, or local networks that mayor may not be in data communication with another network. However, many communication devices other than a cellular phone, a PC and a PDA are also contemplated, and particularly contemplated alternative devices include landline telephones, laptop and palmtop computers, and two-way radios.

The wireless requirement means that what is being transmitted utilizes a wireless means of transmission during at least part of its journey. Wireless includes segments of the journey carried by radio wave, microwave, sonic transmission and so forth, but does not include segments carried by copper wires or fiber optics. Nevertheless, it is highly preferred that the device transmitting the information to the distal computer has a direct wireless transmission. In other words, the signal leaves the device by a wireless transmission, even though the signal may later take paths involving copper wires or optical carriers. It is also preferable that the device transmitting the information to the distal computer receives the translation directly from wireless signals. There, the distal computer may send out the translation across a copper wire or optical carrier, but the signal being received by the device is wireless.

Since all permutations of translation are contemplated, there are literally millions of possible permutations contemplated. This can be demonstrated by considering a very narrow subset of only two of the five sense modalities and a "command modality" (Sight, Sound, and Command), the 20 most common spoken languages, and the 20 most common device languages (for PCs, cell phones, PDAs, VCRs and so on). Using that small subset it is calculated that there are 1560 translation permutations (40 languages being translated into any of 39 other languages), and this calculation ignores most of the spoken and-written languages of the earth, as well as most of the command languages, the various languages of music and art, and so forth.

While it is generally contemplated that information is translated from one sense modality and language into a second sense modality and language different from the first, it is also contemplated that the translation may also be into two or more sense modalities and languages. Thus, a person may speak to a crowd of people having different nationalities, the speech may be sent via cell phone to a distal computer, and the distal computer may translates the speech into two or more languages, which are then transmitted back to numerous cell phones in the vicinity of the speaker. In some cases, as mentioned above, the language may be returned as spoken words, and in other instances as written words or characters.

It should also be appreciates that the term "distal computer" includes both single computers and networks. It is very likely, for example, that the methods and systems embodied herein will involve a load balanced server farm. A telephone company or subsidiary may well operate the server farm.

Thus, specific embodiments and applications of distal translations methods and systems have been disclosed. It should also be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A system comprising software operable in cooperation with a mobile phone, within which is contained electronics configurable by the software to:
   receive, by the mobile phone, human understandable speech;
   transmit, by the mobile phone, the speech to a service distal from the mobile phone;
   receive, by the mobile phone, an address related to a target device from the service, wherein the target device is distal from the service and the service uses the transmitted speech to return the address to the mobile phone and the service returns the address without contacting the target device;
   contact, by the mobile phone, the target device based at least in part on the received address;
   receive, by the mobile phone, a translation of the speech from the service, wherein the translation of the speech has a different sense modality from that of the speech; and
   transmit, by the mobile phone, the received translation to the received address of the target device,
   wherein the address includes information to identify the target device.

2. The system of claim 1, wherein the received address is not a phone number.

3. The system of claim 1, wherein the received address provides access to a web page, the software triggers the mobile phone to wirelessly contact the received address.

4. The system of claim 1, wherein the received address comprises a phone number.

5. The system of claim 1, wherein the system triggers the mobile phone to send a command to operate multiple cell phones.

6. The system of claim 1, wherein the service translates the speech.

7. The system of claim 1, wherein the target device is wirelessly coupled to the service.

8. The system of claim 1, wherein the service further returns a command that is rendered by the target device using an image.

9. The system of claim 1, wherein the mobile phone can display written text and images.

10. The system of claim 1, wherein the service further returns a command that is rendered by the mobile phone using voice recognition.

11. The system of claim 1, wherein the mobile phone can render a command by displaying a color.

12. The system of claim 1, wherein the service further returns a command that is rendered by the target device using sound.

13. The system of claim 1, wherein the service further returns a command that is rendered by the mobile phone using an image.

14. The system of claim 1, wherein the speech is in a first language and the translation is in a second language different from the first language.

15. The system of claim 1, wherein the translation includes a command that causes the target device to perform an operation upon the target device receiving the translation.

16. A system comprising software operable in cooperation with a mobile phone, within which is contained electronics configurable by the software to:
   receive, by the mobile phone, human understandable speech;
   transmit, by the mobile phone, the speech to a service distal from the mobile phone;
   receive, by the mobile phone, an address related to a target device from the service, wherein the target device is distal from the service and the service uses the transmitted speech to return the address to the mobile phone and the service returns the address without contacting the target device;
   contact, by the mobile phone, the target device based at least in part on the received address,
   wherein the system triggers the mobile phone to send a command to operate multiple cellphones;
   receive, by the mobile phone, a translation of the speech from the service, wherein the translation of the speech has a different sense modality from that of the speech; and
   transmit, by the mobile phone, the received translation to the received address of the target device,
   wherein the address includes information to identify the target device.

* * * * *